Aug. 4, 1925.
J. H. O'BRIEN
1,548,094
REMOVABLE TRUCK BODY
Filed Dec. 20, 1922
2 Sheets-Sheet 1
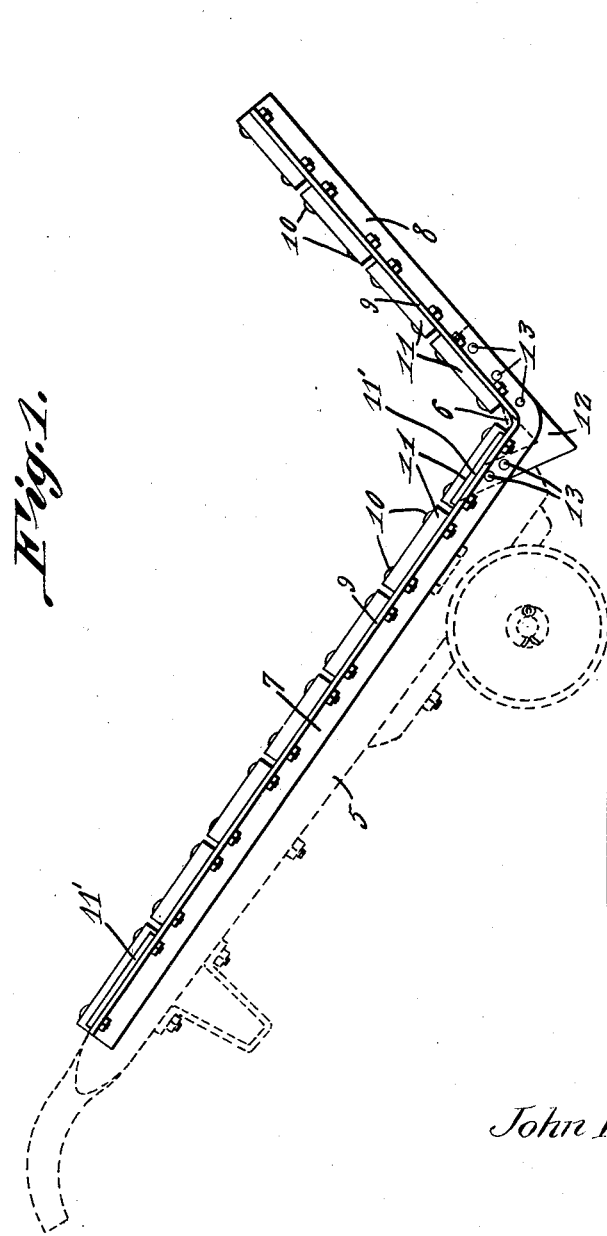
John H. O'Brien
Inventor
By C.A.Snow&Co.
Attorneys

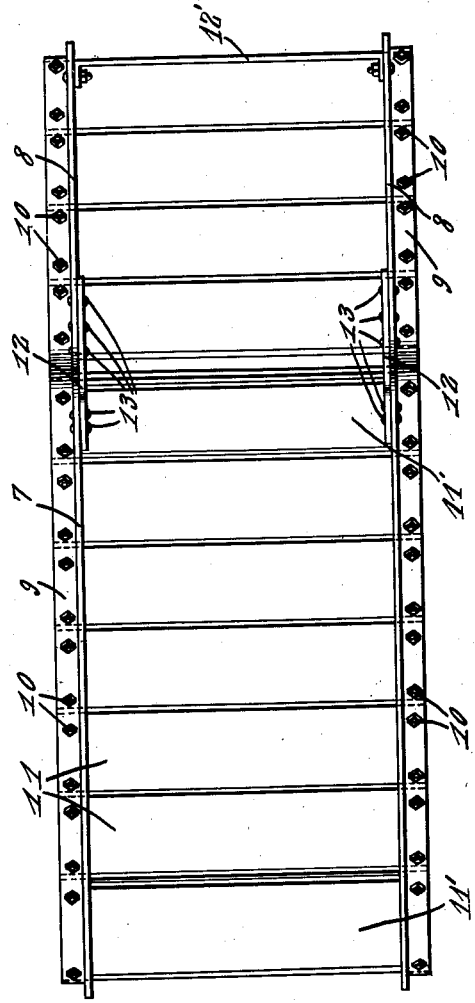

Patented Aug. 4, 1925.

UNITED STATES PATENT OFFICE.

JOHN HENRY O'BRIEN, OF WATERTOWN, NEW YORK, ASSIGNOR TO ADAMS EQUIPMENT COMPANY, INC., OF WATERTOWN, NEW YORK.

REMOVABLE TRUCK BODY.

Application filed December 20, 1922. Serial No. 607,976.

*To all whom it may concern:*

Be it known that I, JOHN H. O'BRIEN, a citizen of the United States, residing at Watertown, in the county of Jefferson and State of New York, have invented new and useful Removable Truck Bodies, of which the following is a specification.

This invention has reference to hand trucks, and more particularly to removable bodies or racks to be employed for supporting the articles positioned on the truck.

The primary object of the invention is to provide a removable body which will present smooth supporting surfaces, eliminating any possibility of the bolts or other securing devices piercing or tearing the articles supported by the truck.

A further object of the invention is to provide a device of this character which may be supported in an upright position to enable a person operating the truck to pass the lip of the truck under the removable body to position the same on the truck.

A still further object is to provide a novel form of frame, forming a part of the removable body, whereby the side rails of the frame may fit over the sills of the truck in a manner to prevent lateral movement of the removable body.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a truck disclosing a removable rack or body as supported thereon.

Fig. 2 is a bottom plan view thereof.

Referring to the drawings in detail, the device is shown as supported on a truck, the sills thereof being indicated at 5, and the lip, which is usually constructed of metal and positioned at the forward end thereof, is indicated at 6.

The rack or body portion which is of the removable type embodies a frame including a pair of side rails 7 formed preferably of angle bars, each angle bar having one end portion angularly disposed relative to the remaining portion, to form sills 8 adapted to rest on the platform or other supporting surface during the loading of the rack or body portion.

The flanges 9 forming parts of the angle bars are supplied with suitable openings to accommodate the bolts 10, which are employed for securing the bottom 11 of the rack or body, to the angle bars. This bottom 11 can be formed of boards as shown. Plates 11' connect the side rails of the truck and are secured thereto in a manner to secure the side rails in proper spaced relation. In order that the outer ends of the side rails will be held at the outer ends thereof, a connecting bar 12' is provided as shown by Fig. 2 of the drawings. Extending from the angle portions of the bars 7 are the supports 12, that extend rearwardly to hold the removable rack or body in an upstanding position so that it will not tilt or fall over while the same is being loaded. These supports may be bolted to the bars 7 as at 13 and as shown, the floor engaging edges of the supports are in the same plane with the corresponding edges of the end portions 8 of the rails 7.

From the foregoing it will be seen that due to the construction of the removable rack or body, the rails 7 thereof may fit over the sills 5 of the truck and prevent lateral movement of the removable rack or body.

The angular supports 12 not only constitute means for preventing the upstanding body from tilting under the weight of the load thereon but they also act as braces for reinforcing the angle portions of the frame of the body, thereby preventing distortion of the frame when subjected to strains. The angle portions of the supports 12 constitute fulcrums on which the body tilts during the initial movement of the body onto a truck as hereinafter explained.

It is to be understood that a number of these bodies are to be provided and each body is to be placed with its angularly disposed end portion lowermost and the supports 12 engaging the supporting surface so as to prevent the body from tilting over. The goods to be transported are stacked on the lowermost portion of each upstanding body and when one of the loaded bodies is to be shifted, an ordinary truck is placed in an upstanding position against the body with the lip of the truck projectng between the supports 12 and between the end portions 8 of the rails. By then swinging the truck downwardly in usual manner, the lip will push upwardly on the load and cause the body to swing backwardly and downwardly about the points or bearing terminals of the supports 12 until the truck is partly lowered with the center of gravity of the load past the dead center. The truck can then be moved in the usual way with the load thereon, it being obvious that the goods will remain undisturbed during this handling of the body. When the truck reaches its destination, the foregoing operation can be reversed with the result that the body will be again deposited on a supporting surface with the end portions 8 resting on said surface and the load stacked on the body as in the first instance. The truck lip can then be withdrawn from under the body.

A plurality of these removable racks or bodies may be used with a single truck, that is to say that while one removable rack or body is being moved to a place to be unloaded, another rack or body may be loaded to be transferred by the truck upon the return of the truck to the place of loading.

What is claimed is:—

1. A removable rack or body for trucks including a frame having its opposite end portions disposed at an angle to each other, a load supporting bottom carried by and fitting in the angle of the frame, and fulcrum means extending from the frame for supporting the removable body in an upstanding position.

2. A removable rack or body for trucks including a frame having one end portion angularly disposed relative to the remaining portion, a bottom secured to the frame and fitted in the angle portion, and angular braces secured to the side portions of the frame outside of but adjacent to the angles of the frame.

3. A removable rack or body for trucks including a frame having one end portion angularly disposed relative to the remaining portion, a bottom secured to the frame and fitted in the angle portion, angular braces secured to the side portions of the frame outside of but adjacent to the angles of the frame, said braces constituting supports for holding the frame against tilting under the weight of the load when the frame is in an upstanding position, and a fulcrum for the frame when tilted.

4. A removable rack or body for trucks including a body having one end portion disposed at an angle to the other end portion and adapted to lie substantially horizontal while the body is in an upstanding position during the loading thereof, and fulcrum means extending from said end portion of the body for holding the body against tilting during the stacking of the load upon said end portion of the body.

5. A removable rack or body for trucks including a body having one end portion disposed at an angle to the other end portion and adapted to lie substantially horizontal while the truck is in an upstanding position during the loading thereof, and fulcrum means extending from said end portion of the body for holding the body against tilting during the stacking of the load upon said end portion of the body, said means constituting braces for the angle portion of the body.

6. A removable rack or body for trucks including a body having one end portion angularly disposed relative to the remaining portion of the body, and adapted to be supported substantially horizontal during the stacking of a load thereon while the body is in an upstanding position, and fulcrum means extending from said end portion of the body for spacing it from a supporting surface and holding the body against tilting under the weight of the load stacked thereon.

7. A removable rack or body for trucks including a body having one end portion angularly disposed relative to the remaining portion of the body, and adapted to be supported substantially horizontal during the stacking of a load thereon while the body is in an upstanding position, and fulcrum means extending from said end portion of the body for spacing it from a supporting surface, for holding the body against tilting under the weight of the load stacked thereon, and for reinforcing the angle portion of the body.

8. A removable rock or body for trucks including spaced bars having angular end portions, boards for connecting the bars, and means secured to the bars for supporting the removable body in an upstanding position.

9. A removable rack or body for trucks including spaced bars having angular end portions, boards for connecting the bars and holding them in spaced relation with each other, said bars adapted to fit over the sills of a truck, and means for supporting the body in an upstanding position.

10. A removable rack or body for trucks including spaced bars having angular end portions, boards for connecting the bars, said boards being arranged in spaced relation with each other, the bars adapted to fit over the sills, of a hand truck, the space between the bars adapted to receive the lip of a truck, to restrict movement of the removable body longitudinally of the truck, and means for supporting the removable body in an upright position.

11. A rack or body for trucks including a frame having an upstanding portion and sills formed by the lower portion of the frame, said sills adapted to rest upon a supporting surface and said upstanding portion being inclined relative to the sills, load supporting means carried by the sills and by the upstanding portion of the frame, and means projecting from the frame and normally overhung by the upstanding portion of the frame and the load supporting means thereon, for engaging the supporting surface on which the sills rest to hold the rack against tilting under the weight of the supported load.

12. A rack for trucks including sills adapted to rest throughout their length upon a supporting surface, an upstanding portion inclined relative to the sills, means on the sills and upstanding portions for supporting a load, and means extending from the upstanding portions and normally overhung thereby for engaging the surface on which the sills are mounted to hold the rack against tilting under the weight of a load piled upon the sills and the upstanding portion of the rack.

In testimony that I claim the foregoing as my own, I have hereto affixed my signature in the presence of two witnesses.

JOHN HENRY O'BRIEN.

Witnesses:
   JOHN M. CARPENTER,
   WALTER M. HYATT.